(12) United States Patent
Elliott et al.

(10) Patent No.: US 8,240,123 B2
(45) Date of Patent: Aug. 14, 2012

(54) INTEGRATED BIOMASS ENERGY SYSTEM

(75) Inventors: Gerald R. Elliott, Marietta, GA (US); Carl E. Linderoth, Norcross, GA (US); Clifford T. McConnell, Birmingham, AL (US); Alvin D. Short, Waleska, GA (US)

(73) Assignee: Zilkha Biomass Power LLC, Houston, TX (US)

( * ) Notice: Subject to any disclaimer, the term of this patent is extended or adjusted under 35 U.S.C. 154(b) by 0 days.

(21) Appl. No.: 13/008,715

(22) Filed: Jan. 18, 2011

(65) Prior Publication Data

US 2011/0120140 A1    May 26, 2011

Related U.S. Application Data

(62) Division of application No. 11/279,513, filed on Apr. 12, 2006, now abandoned.

(60) Provisional application No. 60/670,565, filed on Apr. 12, 2005.

(51) Int. Cl.
*F02C 3/26* (2006.01)
*F23K 3/00* (2006.01)

(52) U.S. Cl. .................. 60/39.464; 60/755; 110/263

(58) Field of Classification Search .............. 60/39.464, 60/781, 752, 755, 756, 757, 758; 110/264, 110/265, 263
See application file for complete search history.

(56) References Cited

U.S. PATENT DOCUMENTS

| | | | |
|---|---|---|---|
| 751,350 A | 2/1904 | Schutz | |
| 1,130,389 A | 3/1915 | Fulton | |
| 1,618,808 A | 2/1927 | Burg | |
| 1,795,347 A | 3/1931 | Reese | |
| 1,910,735 A | 5/1933 | Zikesch | |
| 2,311,350 A | 2/1943 | Richardson | |
| 2,515,541 A | 7/1950 | Yellott | |
| 2,800,093 A | 7/1957 | Burg | |
| 2,973,727 A | 3/1961 | Northcote | |
| 3,161,020 A | 12/1964 | La Haye | |

(Continued)

FOREIGN PATENT DOCUMENTS

CA    2433991    7/2002

(Continued)

OTHER PUBLICATIONS

AgriPower Website (http://www.agripowerinc.com/process_summary.html), visited Sep. 29, 2006.

(Continued)

*Primary Examiner* — Ted Kim
(74) *Attorney, Agent, or Firm* — Hall Estill Law Firm

(57) ABSTRACT

A cyclonic combustor comprising a combustion liner forming a combustion chamber having a generally cylindrical shape, a biomass feed inlet for receiving biomass particles under pressure, wherein the biomass feed inlet is formed so that the biomass particles are introduced into the ignition zone of the combustion chamber with a tangential component relative to the longitudinal axis of the combustion liner, and a plurality of air tuyeres formed through the combustion liner for receiving compressed air, wherein the plurality of air tuyeres are arranged to introduce the compressed air into the combustion chamber with a tangential component relative to the longitudinal axis of the combustion liner. A direct-fired biomass-fueled pressurized gas turbine system comprising a pressurized feed system, the cyclonic combustor, and a gas turbine. Methods of operating a cyclonic combustor and methods for direct firing a gas turbine.

26 Claims, 8 Drawing Sheets

U.S. PATENT DOCUMENTS

| | | |
|---|---|---|
| 3,777,678 A | 12/1973 | Lutes et al. |
| 3,837,303 A | 9/1974 | Baardson |
| 3,856,455 A | 12/1974 | Otway |
| 4,104,017 A | 8/1978 | Alin |
| 4,186,668 A | 2/1980 | Tabel |
| 4,255,927 A * | 3/1981 | Johnson et al. ............... 60/39.23 |
| 4,257,760 A | 3/1981 | Schuurman |
| 4,280,415 A | 7/1981 | Wirguin |
| 4,326,382 A | 4/1982 | Baardson |
| 4,351,251 A | 9/1982 | Brashears |
| 4,380,154 A | 4/1983 | Eastman |
| 4,409,786 A | 10/1983 | Hamrick et al. |
| 4,414,813 A | 11/1983 | Knapp |
| 4,468,923 A | 9/1984 | Jorzyk |
| 4,476,674 A | 10/1984 | Berman |
| 4,492,085 A | 1/1985 | Stahl |
| 4,507,075 A | 3/1985 | Buss |
| 4,530,700 A | 7/1985 | Sawyer |
| 4,565,137 A | 1/1986 | Wright |
| 4,574,711 A | 3/1986 | Christian |
| 4,584,948 A | 4/1986 | Syred |
| 4,612,865 A | 9/1986 | Nilsson |
| 4,642,864 A | 2/1987 | Metcalfe |
| 4,655,147 A | 4/1987 | Brannstrom et al. |
| 4,671,192 A | 6/1987 | Hoffert et al. |
| 4,687,436 A | 8/1987 | Shigeta |
| 4,702,181 A | 10/1987 | Brown |
| 4,724,780 A | 2/1988 | Hoffert |
| 4,773,214 A | 9/1988 | Pitt et al. |
| 4,785,621 A | 11/1988 | Alderson |
| 4,850,288 A | 7/1989 | Hoffert |
| 4,860,536 A | 8/1989 | Brannstrom |
| 4,869,062 A | 9/1989 | Bar |
| 4,909,029 A | 3/1990 | Pitt |
| 4,909,030 A | 3/1990 | Ishihara |
| 4,911,088 A | 3/1990 | McConnell |
| 4,919,611 A | 4/1990 | Flament |
| 4,920,925 A | 5/1990 | Korenberg |
| 5,059,404 A | 10/1991 | Monsour et al. |
| 5,121,600 A | 6/1992 | Sanders |
| 5,123,361 A | 6/1992 | Nieh |
| 5,158,025 A * | 10/1992 | Johnson ........................ 110/235 |
| 5,183,642 A | 2/1993 | Lenglet |
| 5,199,356 A | 4/1993 | Hoffert |
| 5,255,506 A | 10/1993 | Wilkes et al. |
| 5,272,866 A | 12/1993 | Nieminen |
| 5,309,710 A * | 5/1994 | Corr, II ........................ 60/39.23 |
| 5,341,637 A | 8/1994 | Hamrick |
| 5,517,818 A | 5/1996 | Leithner |
| 5,544,479 A | 8/1996 | Yan |
| 5,581,998 A | 12/1996 | Craig |
| 5,687,570 A | 11/1997 | Bronicki |
| 5,706,742 A | 1/1998 | Hamrick |
| 5,720,165 A | 2/1998 | Rizzie |
| 5,755,165 A | 5/1998 | Sonoda |
| 5,775,267 A | 7/1998 | Hou |
| 5,996,351 A | 12/1999 | Feitelberg et al. |
| 6,066,898 A | 5/2000 | Jensen |
| 6,193,768 B1 | 2/2001 | Galipeault |
| 6,199,494 B1 | 3/2001 | Griffin |
| 6,269,755 B1 | 8/2001 | Boswell |
| 6,293,208 B1 | 9/2001 | Guiot |
| 6,363,868 B1 | 4/2002 | Boswell et al. |
| 6,615,748 B2 | 9/2003 | Sunter et al. |
| 6,767,375 B1 | 7/2004 | Pearson |
| 6,830,597 B1 | 12/2004 | Green |
| 6,862,877 B1 | 3/2005 | James |
| 6,912,854 B2 | 7/2005 | Inoue et al. |
| 6,972,114 B2 | 12/2005 | Pope et al. |
| 7,013,648 B2 | 3/2006 | Griffin et al. |
| 7,059,256 B2 | 6/2006 | Ingvarsson |
| 2004/0088979 A1 | 5/2004 | Talbott |
| 2004/0221583 A1 | 11/2004 | Wylie |

FOREIGN PATENT DOCUMENTS

| | | |
|---|---|---|
| DE | 3222405 | 12/1983 |
| DE | 60106976 T2 | 12/2005 |
| EP | 0080429 A1 | 6/1983 |
| EP | 0098481 | 1/1984 |
| EP | 1350016 B1 | 11/2004 |
| GB | 1539508 | 1/1979 |
| GB | 2402172 A | 12/2004 |
| GB | 2420382 A | 5/2006 |
| JP | 56034928 | 4/1981 |
| WO | 02/055855 A1 | 7/2002 |

OTHER PUBLICATIONS

International Search Report and Opinion of International Search Authority in related application PCT/US06/13843, mailed Oct. 26, 2007.

International Search Report and Opinion of International Search Authority in application PCT/US07/79895, mailed Jul. 21, 2008.

Supplemental European Search Report and Opinion in application EP06750020, mailed Oct. 15, 2008.

* cited by examiner

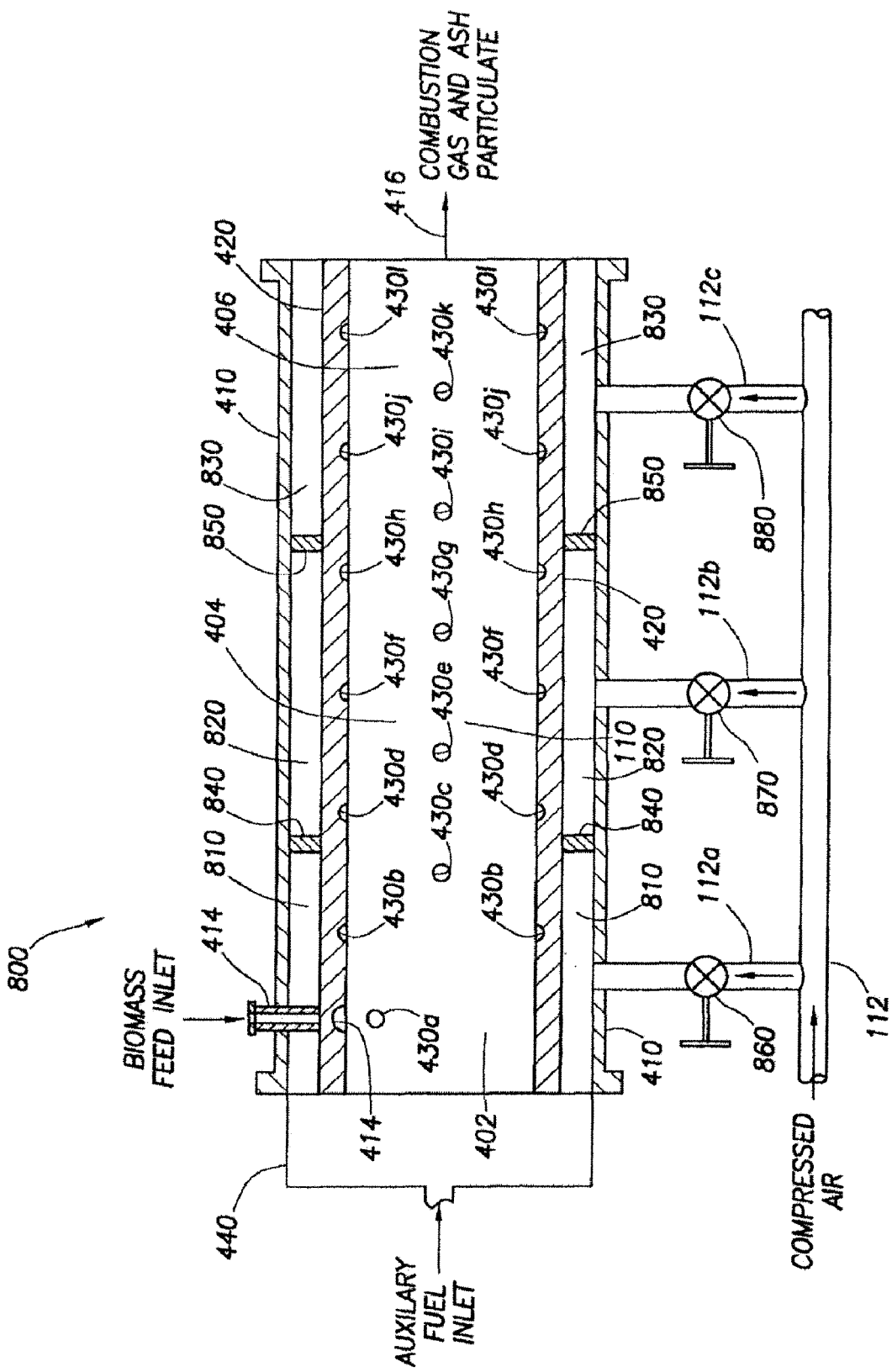

INTEGRATED BIOMASS ENERGY SYSTEM

CROSS-REFERENCE TO RELATED APPLICATION

This application is a divisional application of U.S. Ser. No. 11/279,513, filed Apr. 12, 2006, now abandoned, which claims priority and benefit to commonly owned U.S. provisional patent application Ser. No. 60/670,565, filed Apr. 12, 2005, entitled "Integrated Biomass Energy System," by Gary R. Elliot and Joseph P. Reynolds. The contents and disclosures of each of the above-referenced applications are hereby expressly incorporated herein by reference in their entirety.

BACKGROUND

There are a number of industries that generate large quantities of biomass. Two examples include the forest products and agricultural industries. For example, in the forest product industries, large quantities of biomass are generated, including sawdust, bark, twigs, branches, and other waste wood. Likewise, in the agricultural industries, each crop cycle results in large quantities of biomass, including bagasse, corn cobs, rice hulls, and orchard and vine trimmings. Additional biomass waste that is generated includes sludge and manure. Despite the large quantities that are produced, this waste biomass cannot be easily utilized.

To alleviate problems associated with the disposal of biomass, biomass has been used heretofore for power generation. Additionally, because biomass is a renewable resource and because biomass releases the same amount of carbon to the atmosphere as it does when it decomposes naturally, the use of biomass for power generation may address several problems with conventionally fossil fuels.

One technique that has been developed for using biomass for power generation is gasification. In gasification, biomass is converted to a combustible gas, which may then be used to generate electricity, for example in a gas turbine. However, when employed in small-scale power system (e.g., less than about 10 megawatts), these gasification techniques typically have lower thermal efficiencies and higher capital and operating costs than the direct-fired gas turbine power systems discussed below. Likewise, techniques using solid fuels such as biomass for steam generation also typically have lower thermal efficiencies and higher capital and operating costs than the direct-fired gas turbine power systems discussed below.

As an alternative to gasification and steam generation techniques, power systems that generate electricity by driving gas turbines, using solid fuels such as biomass, have also been used. Gas turbine power systems that operate on solid fuel may be designed as either indirect-fired or direct-fired systems. These systems typically have several primary components, including an air compressor, a furnace or combustor, a turbine, and an electric generator. The electric generator and air compressor are driven by energy created by expansion of hot compressed air through the turbine. This hot compressed air for expansion across the turbine is generated by compressing air in the compressor and heating the resultant compressed air with thermal energy generated by the furnace or combustor.

In indirect-fired systems, the furnace or combustor typically operates as a separate functional unit apart from a functional unit containing the air compressor and the turbine. This design for indirect-firing protects the gas turbine from corrosive effluents and particulate matter typically present in the hot exhaust gases from a furnace or combustor operating on biomass by use of a high temperature heat exchanger. In the high temperature heat exchanger, ducts containing the compressed air from the compressor may be placed in close proximity to ducts bearing highly heated exhaust gases from the furnace or combustor, resulting in exchange of heat from the hot exhaust gases to the compressed air. This heated and compressed air then drives the turbine which in turn drives the air compressor and electric generator. In addition to higher capital costs and operating costs, these indirect-fired systems have lower thermal efficiencies than direct-fired system.

In direct-fired systems, the solid fuel is burned in a pressurized combustor and the heated effluent gases from the combustor are vented directly into the turbine. The combustor is part of an integrated, pressurized unit that includes both the compressor and the turbine. In many instances, gas cleaning equipment may be employed between the combustor and turbine to reduce the entry of corrosive effluents and particulate matter into the turbine.

SUMMARY

In general, one aspect of the invention features a cyclonic combustor. The cyclonic combustor comprises a combustion liner forming a combustion chamber having a generally cylindrical shape. The cyclonic combustor further comprises a biomass feed inlet at one end of the combustion chamber formed through the combustion liner for receiving biomass particles under pressure, wherein the biomass feed inlet is formed so that the biomass particles are introduced into the ignition zone of the combustion chamber with a tangential component relative to the longitudinal axis of the combustion liner. The cyclonic combustor further comprises a plurality of air tuyeres formed through the combustion liner for receiving compressed air, wherein the plurality of air tuyeres are arranged to introduce the compressed air into the combustion chamber with a tangential component relative to the longitudinal axis of the combustion liner, wherein the plurality of air tuyeres are spaced along the length of the combustion liner from about the biomass feed inlet. The cyclonic combustor further comprises a cyclonic ash separator. The cyclonic ash separator comprises a choke element that comprises an opening of reduced cross-sectional area as compared to the cross-sectional area of the combustion chamber, the choke element having an input in communication with the combustion chamber outlet for receiving the combustion gas from the combustion chamber. The cyclonic ash separator further comprises a particulate ash opening defined between the choke element and the combustion liner, wherein at least a portion of the particulate ash exits the combustion chamber via the particulate ash opening.

Another aspect of the invention features another cyclonic combustor. The cyclonic combustor comprises a combustion liner forming a combustion chamber having a generally cylindrical shape and having an ignition zone, a combustion zone, and a dilution zone arranged longitudinally along the axis of the combustion chamber. The cyclonic combustor further comprises a biomass feed inlet at one end of the combustion chamber formed through the combustion liner for receiving biomass particles under pressure, wherein the biomass feed inlet is formed so that the biomass particles are introduced into the ignition zone of the combustion chamber with a tangential component relative to the longitudinal axis of the combustion liner. The cyclonic combustor further comprises a plurality of air tuyeres formed through the combustion liner for receiving compressed air, wherein the plurality of air tuyeres are arranged to introduce the compressed air into the combustion chamber with a tangential component relative to the longitudinal axis of the combustion liner, wherein the plurality of air tuyeres are spaced along the length of the combustion liner from about the biomass feed inlet. At least one of the plurality of air tuyeres supplies a sufficient amount of compressed air to the ignition zone for ignition of the biomass particles to begin the combustion. At least one of the plurality of air tuyeres supplies a sufficient amount of compressed air to the combustion zone to complete the combustion of the biomass particles from the ignition zone. And at least one of the plurality of air tuyeres supplies a sufficient amount of compressed air to the dilution zone to dilute the combustion gas to a temperature suitable for use in a gas turbine.

Another aspect of the invention features a direct fired biomass-fueled pressurized gas turbine system. The system comprises a pressurized feed system that comprises a plurality of chambers wherein a first chamber receives biomass particles at atmospheric pressure and supplies a second chamber with biomass particles under pressure, a first valve positioned at an inlet of the first chamber; a second valve positioned at an outlet of the first chamber to the second chamber; and an air compressor arranged to pressurize the first chamber. The system further comprises a cyclonic combustor for combustion of biomass particles under pressure to produce a combustion gas and particulate ash. The cyclonic combustor comprises a combustion liner forming a combustion chamber having a generally cylindrical shape, wherein the combustion chamber has a pressure less than the pressure of the second chamber of the pressurized feed system, a biomass feed inlet at one end of the combustion chamber formed through the combustion liner for receiving the biomass particles from the pressurized feed system, wherein the biomass feed inlet is formed so that the biomass particles are introduced into the combustion chamber with a tangential component relative to the longitudinal axis of the combustion liner, and a plurality of air tuyeres formed through the combustion liner for receiving compressed air, wherein the plurality of air tuyeres are arranged to introduce the compressed air into the combustion chamber with a tangential component relative to the longitudinal axis of the combustion liner. The system further comprises a gas turbine that comprises a turbine section comprising an inlet in communication with the combustion chamber for receiving the combustion gas from the combustion chamber, wherein the turbine section is driven by the combustion gas. The gas turbine further may comprise a compressor section driven by the turbine section, wherein the compressor section is arranged to provide the compressed air to the combustion chamber. The system further may comprise an electric generator coupled to the gas turbine for generating electric power, wherein the electric generator is driven by the turbine section.

Another aspect of the invention features another direct-fired biomass-fueled pressurized gas turbine system. The system comprises a pressurized feed system and a cyclonic combustor for combustion of biomass particles under pressure to produce a combustion gas and ash particulate. The cyclonic combustor comprises a combustion liner forming a combustion chamber having a generally cylindrical shape and having an ignition zone, a combustion zone, and a dilution zone arranged longitudinally along the axis of the combustion chamber. The cyclonic combustor further comprises a biomass feed inlet at one end of the combustion chamber formed through the combustion liner for receiving biomass particles from the pressurized feed system, wherein the biomass feed inlet is formed so that the biomass particles are introduced into the ignition zone of the combustion chamber with a tangential component relative to the longitudinal axis of the combustion liner. The cyclonic combustor further comprises a plurality of air tuyeres formed through the combustion liner for receiving compressed air, wherein the plurality of air tuyeres are arranged to introduce the compressed air into the combustion chamber with a tangential component relative to the longitudinal axis of the combustion liner, wherein the plurality of air tuyeres are spaced along the length of the combustion liner from about the biomass feed inlet. At least one of the plurality of air tuyeres supplies a sufficient amount of compressed air to the ignition zone for ignition of the biomass particles to begin the combustion. At least one of the plurality of air tuyeres supplies a sufficient amount of compressed air to the combustion zone to complete the combustion of the biomass particles from the ignition zone. And at least one of the plurality of air tuyeres supplies a sufficient amount of compressed air to the dilution zone to dilute the combustion gas to a temperature suitable for use in a gas turbine. The system further comprises a gas turbine that comprises a turbine section comprising an inlet in communication with the combustor for receiving the combustion gas from the combustion chamber, wherein the turbine section is driven by the combustion gas. The gas turbine further may comprise a compressor section driven by the turbine section, wherein the compressor section is arranged to provide the compressed air to the combustion chamber. The system further may comprise an electric generator coupled to the gas turbine for generating electric power, wherein the electric generator is driven by the turbine section.

Another aspect of the present invention features another direct-fired biomass-fueled pressurized gas turbine system. The system comprises a pressurized feed system and a cyclonic combustor for combustion of biomass particles under pressure to produce a combustion gas and particulate ash. The cyclonic combustor comprises a combustion liner forming a combustion chamber having a generally cylindrical shape. The cyclonic combustor further comprises a biomass feed inlet at one end of the combustion chamber formed through the combustion liner for receiving biomass particles from the pressurized feed system, wherein the biomass feed inlet is formed so that the biomass particles are introduced into the combustion chamber with a tangential component relative to the longitudinal axis of the combustion liner. The cyclonic combustor further comprises a plurality of air tuyeres formed through the combustion liner for receiving compressed air, wherein the plurality of air tuyeres are arranged to introduce the compressed air into the combustion chamber with a tangential component relative to the longitudinal axis of the combustion liner, wherein the plurality of air tuyeres are spaced along the length of the combustion liner from the biomass feed inlet. The system further comprises a cyclonic ash separator. The cyclonic ash separator comprises a choke element comprising an opening of reduced cross-sectional area as compared to the cross-sectional area of the combustion chamber, wherein the choke element has an input in communication with the combustion chamber outlet for receiving the combustion gas from the combustion chamber. The cyclonic ash separator further comprises a particulate ash opening defined between the choke element and the combustion liner, wherein at least a portion of the particulate ash exits the combustion chamber via the particulate ash opening. The system further comprises a gas turbine that comprises a turbine section comprising an inlet in communication with the combustor for receiving the combustion gas from the combustion chamber, wherein the turbine section is driven by the combustion gas. The gas turbine further may comprise a compressor section driven by the turbine section, wherein the compressor section is arranged to provide the compressed air to the combustion chamber. The system further may comprise an electric generator coupled to the gas turbine for generating electric power, wherein the electric generator is driven by the turbine section.

Another aspect of the present invention features a method for operating a cyclonic combustor comprising a combustion liner that forms a substantially cylindrically shaped combustion chamber. The method comprises supplying biomass particles to the combustion chamber under pressure, wherein the biomass particles are transferred into the pressurized combustion chamber with a tangential component relative to the longitudinal axis of the combustion chamber. The method further comprises supplying compressed air to the pressurized combustion chamber, wherein the compressed air is supplied to the combustion chamber with a tangential component relative to the longitudinal axis of the combustion chamber so that the biomass particles move through the combustion chamber in a cyclonic motion. The method further comprises burning the biomass particles in the combustion chamber to produce a combustion gas and particulate ash, wherein the combustion gas and the particulate ash move through the combustion chamber in a cyclonic motion. The method further comprises moving a substantial portion of the combustion gas through an opening in a choke element present in the cyclonic combustor, wherein the choke opening has a reduced cross-sectional area as compared to the cross-sectional area of the combustion chamber. The method further comprises allowing at least a portion of the particulate ash to exit the combustion chamber through a particulate ash opening defined between the choke element and the combustion liner.

Another aspect of the present invention features another method for operating a cyclonic combustor comprising a combustion liner that forms a substantially cylindrically shaped combustion chamber. The method comprises supplying biomass particles under pressure to an ignition zone of the combustion chamber, wherein the biomass particles are transferred into the ignition zone with a tangential component relative to the longitudinal axis of the combustion chamber. The method further comprises supplying compressed air to the ignition zone of the combustion chamber in an amount sufficient to ignite the combustion of the biomass particles, wherein the compressed air is supplied to the ignition zone with a tangential component relative to the longitudinal axis of the combustion chamber so that the biomass particles rotate in the combustion chamber in a cyclonic motion. The method further comprises moving the ignited biomass particles from the ignition zone of the combustion chamber to a combustion zone of the combustion chamber. The method further comprises supplying compressed air to the combustion zone of the combustion chamber in an amount sufficient to complete the combustion of the biomass particles, wherein the compressed air is supplied to the combustion zone with a tangential component relative to the longitudinal axis of the combustion chamber so that the biomass particles rotate in the combustion chamber in a cyclonic motion. The method further comprises moving the combustion gas and particulate ash produced from combustion of the biomass particles to a dilution zone of the combustion chamber. The method further comprises supplying compressed air to the dilution zone of the combustion chamber in an amount sufficient to dilute the combustion gas to a temperature suitable for use in a gas turbine, wherein the compressed air is supplied to the dilution zone with a tangential component relative to the longitudinal axis of the combustion chamber so that the particulate ash and the combustion gas rotate in the combustion chamber in a cyclonic motion.

Another aspect of the invention features a method for direct firing a gas turbine. The method comprises supplying biomass particles to a first chamber at atmospheric pressure and pressurizing the first chamber with compressed air from a compressor. The method further comprises transferring the biomass particles from the pressurized first chamber to a pressurized second chamber. The method further comprises transferring the biomass particles from the pressurized second chamber to a pressurized combustion chamber, the pressurized combustion chamber having a generally cylindrical shape, wherein the biomass particles are transferred into the pressurized combustion chamber with a tangential component relative to the longitudinal axis of the combustion chamber. The method further comprises supplying compressed air to the pressurized combustion chamber, wherein the compressed air is supplied to the pressurized combustion chamber with a tangential component relative to the longitudinal axis of the combustion chamber so that the biomass particles rotate in the combustion chamber in a cyclonic motion. The method further comprises burning the biomass particles in the combustion chamber to produce a combustion gas and particulate ash and separating at least a portion of the particulate ash from the combustion gas. The method further comprises supplying the combustion gas from the combustion chamber to a gas turbine comprising a turbine section and allowing the combustion gas to expand through the turbine section of the gas turbine so as to generate mechanical energy. The method further may comprise driving a compressor section of the gas turbine with the mechanical energy generated by the turbine section so as to produce a compressed air stream. The method further may comprise driving an electric generator with the mechanical energy generated by the turbine section so as to generate electric power.

BRIEF DESCRIPTION OF THE DRAWINGS

FIG. 8 is a schematic illustration of an example combustor in accordance with another embodiment of the present invention.

DETAILED DESCRIPTION

Figure 1:
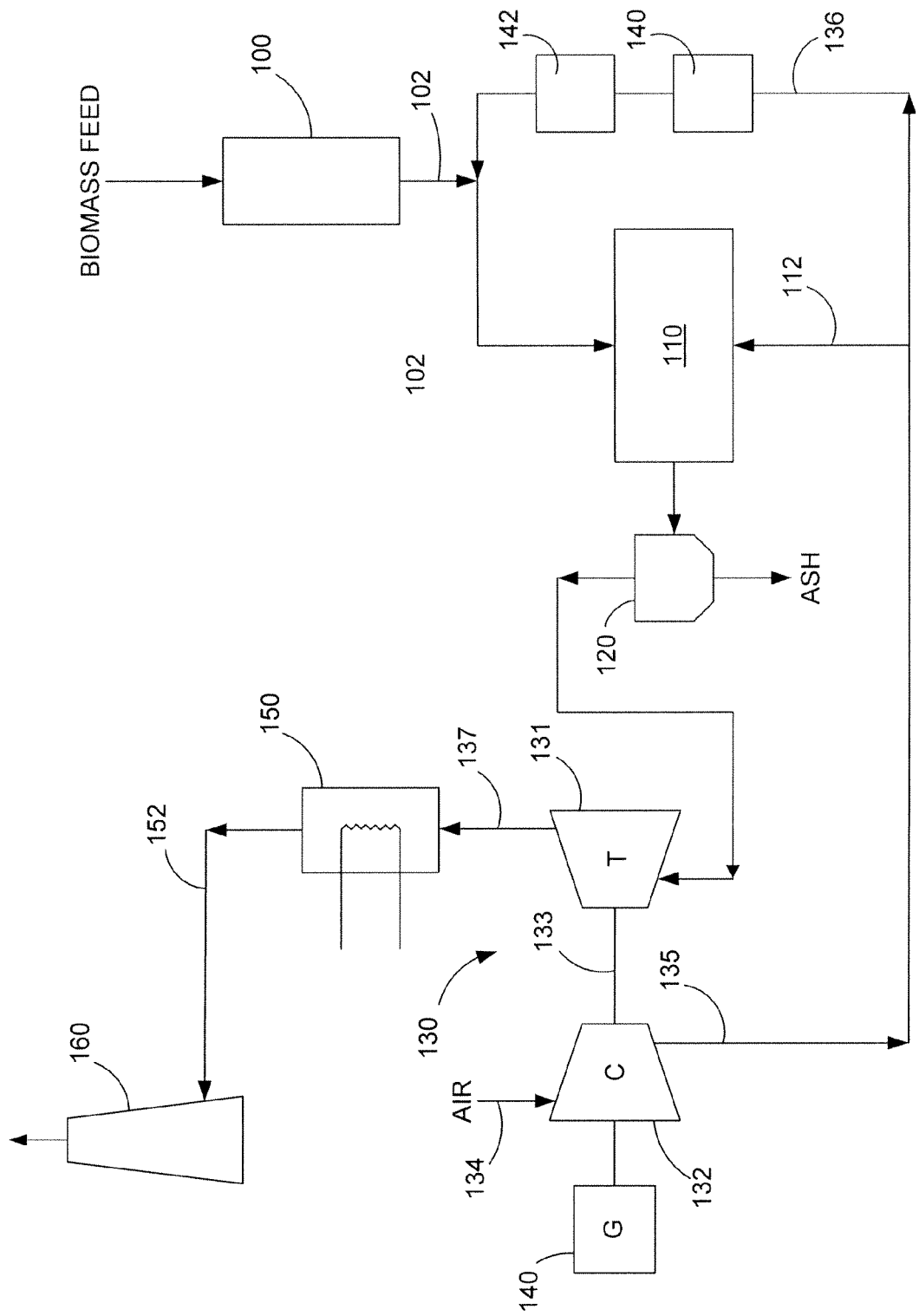
FIG. 1 is a schematic illustration of an example integrated biomass energy system in accordance with one embodiment of the present invention.

FIG. 1 schematically illustrates a new direct-fired biomass-fueled pressurized gas turbine system. This biomass-fueled pressurized gas turbine system may be particularly suitable for small scale power systems, for example, for the generation of less than about 10 megawatts and, in some examples, in the range of from about 0.5 to about 10 megawatts. The system depicted in FIG. 1 generally comprises pressurized feed system 100, combustion chamber 110, cyclonic ash separator 120, gas turbine 130, and generator 140. Biomass particles are supplied to pressurized feed system 100 at substantially atmospheric pressure. An example embodiment of pressurized feed system 100 will be described in more detail with respect to FIGS. 2 and 3. Pressurized feed system 100 supplies biomass particles to combustion chamber 110 at substantially the operating pressure of combustion chamber 110 through pressurized fuel feed line 102. Example embodiments of combustion chamber 110 are described in more detail with respect to FIGS. 4 and 8-10.

The biomass particles supplied to pressurized feed system may comprise any suitable source of biomass, including, sawdust, bark, twigs, branches, other waste wood, bagasse, corn cobs, rice hulls, orchard and vine trimmings, sludge, manure, and combinations thereof. Preferably, the biomass particles supplied to the pressurized feed system comprises a wood-based biomass. The biomass particles supplied to the pressurized feed system should have a particle size suitable for cyclonic combustion, for example, the biomass particles may be sized so that they have a major dimension of less than about 3 millimeters ("mm"). Further, the biomass particles also should have a moisture content suitable for cyclonic combustion, for example, the biomass particles may be dried so that they have a moisture content of less than about 30% and, preferably, a moisture content in the range of from about 8% to about 16%. Those of ordinary skill in the art should recognize that cyclonic combustion generally may have different feed requirements (e.g., size, moisture content, etc.) than other types of combustion.

The biomass particles are burned in combustion chamber 110 under pressure, for example, at an operating pressure in the range of from about 40 pounds per square inch gauge ("psig") to about 300 psig, in some examples, in the range of from about 50 psig to about 220 psig, and, in some examples, in the range of from about 100 psig to about 200 psig. Cyclonic combustion of the biomass particles produces ash particulate and a hot, pressurized combustion gas, for example, at a temperature in the range of from about 1,800° F. to about 2,800° F. and, in some embodiments, in the range of from about 2,200° F. to about 2,400° F. In one example combustion chamber 110 operates at about 150 psig and about 2,100° F.

Figure 7:
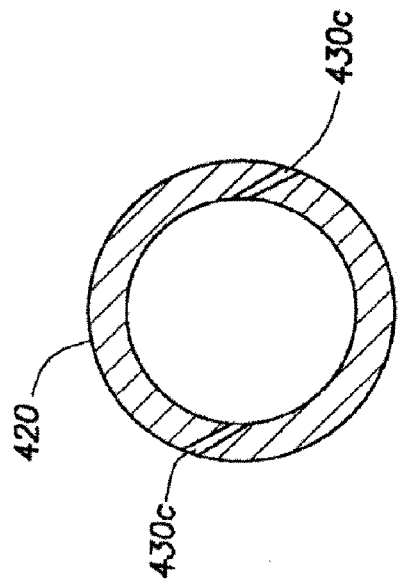
FIG. 7 is a cross-sectional view of the air inlet taken along lines 7-7 of FIG. 4.
Figure 6:
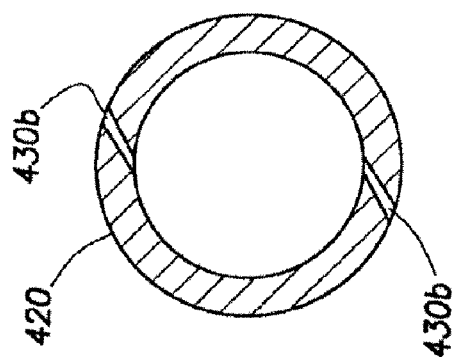
FIG. 6 is a cross-sectional view of the air inlet taken along lines 6-6 of FIG. 4.

Compressed air is also supplied to combustion chamber 110 through compressed air feed line 112. The compressed air should be supplied into combustion chamber 110 so as to promote cyclonic motion within combustion chamber 110. For example, as illustrated by FIGS. 6 and 7, the compressed air may be supplied to combustion chamber 110 tangentially. In addition to providing sufficient oxygen for combustion, a sufficient amount of the compressed air should also be supplied to combustion chamber 110 to dilute the combustion gas so that it has a temperature suitable for use in gas turbine 130, for example, a temperature less than about 2,200° F., and, in one example, in the range of from about 1,500° F. to about 2,200° F.

The combustion gas and ash particulate produced from burning the biomass particles are then supplied to cyclonic ash separator 120. Cyclonic ash separator 120 utilizes centrifugal forces to separate ash particulate from the combustion gas. Preferably, at least about 50% of the ash particulate may be separated from the combustion gas. Those of ordinary skill in the art will recognize that cyclonic ash separator 120 should separate at least a portion (and preferably at least a substantial portion) of the larger ash particulate (e.g., greater than about 10 microns) from the combustion gas but may not separate a substantial portion of the smaller ash particulate (e.g., less than about 1 micron). For example, at least about 80% (preferably, at least about 90%) of ash particulate greater than about 10 microns may be separated from the combustion gas. An example cyclonic ash collector 120 integrated with combustion chamber 110 is described in more detail with respect to FIG. 10.

The combustion gas from cyclonic ash separator 120 is then supplied to gas turbine 130, which comprises turbine section 131 and compressor section 132. Expansion of the combustion gas through turbine section 131 provides mechanical energy to drive compressor section 132. Expansion of the combustion gas through turbine section 131 also provides the mechanical energy necessary to drive generator 140 for generating electric power. As depicted in FIG. 1, gas turbine 130 may have a single shaft 133 so that both turbine section 131 and compressor section 132 may be driven by a single turbine. Alternatively, while not depicted in turbine section 131 may be comprise two shafts operating at different rotational shaft speeds, for example, a first shaft (not depicted) may be used to drive compressor section 132 and a second shaft (not depicted) may be used to drive generator 140.

Gas turbine 130 may be any suitable gas turbine. For example, gas turbine 130 may be a gas-fired turbine wherein the burner has been replaced by combustion chamber 110. Also, gas turbine 130 may have any of a variety of pressure ratios, for example, gas turbines suitable for use may have pressure ratios in the range of from about 8:1 to about 20:1. Furthermore, gas turbine 130 may be capable of dual firing, wherein the gas turbine may be fired using an auxiliary fuel, for example, gas, propane, or a liquid fuel. The auxiliary fuel may be used, for example, when pressured feed system 100 and/or fuel input systems 200, 300 (as depicted in FIGS. 2 and 3) are not operating such as when one or both of those systems are down for maintenance.

Compressor section 132 intakes air via air inlet 134. Turbine section 131 drives compressor section 132 to compress the air and produce compressed air stream 135. An auxiliary motor (not depicted) may be used to drive compressor section 132 during startup of the system. A first portion of compressed air stream 135 may be supplied to combustion chamber through compressed air feed line 112. A second portion 136 of compressed air stream 135 from compressor section 132 may convey the biomass particles from pressurized feed system 100 to combustion chamber 110 in pressurized fuel feed line 102. As needed for a particular application, a second compressor 140 may be used to further compress this second portion 136. Also, as needed for a particular application, the second portion 136 of the compressed air stream 135 from compressor section 132 may be cooled by a heat exchanger 142 to avoid combustion of the biomass particles prior to entering the combustion chamber 110.

Exhaust stream 137 obtained by expanding the combustion gas through turbine section 131 may be at or near atmospheric pressure and at a temperature in the range of from about 600° F. to about 1,200° F. and, in some examples, in the range of from about 900° F. to about 1,000° F. As desired for a particular application, exhaust stream 137 may be used directly or indirectly to provide thermal energy for a particular application. For example, exhaust stream 137 may be used to generate steam, heat another fluid that may be used for heating purposes, preheat the biomass particles, and/or dry the biomass particles. As depicted in FIG. 1, exhaust stream 137 may be passed through passed through heat recovery unit 150 (e.g., a heat exchanger) so as to provide thermal energy for a desired application. From heat recovery unit 150, exhaust stream 152 exits the system through stack 160.

Figure 2:
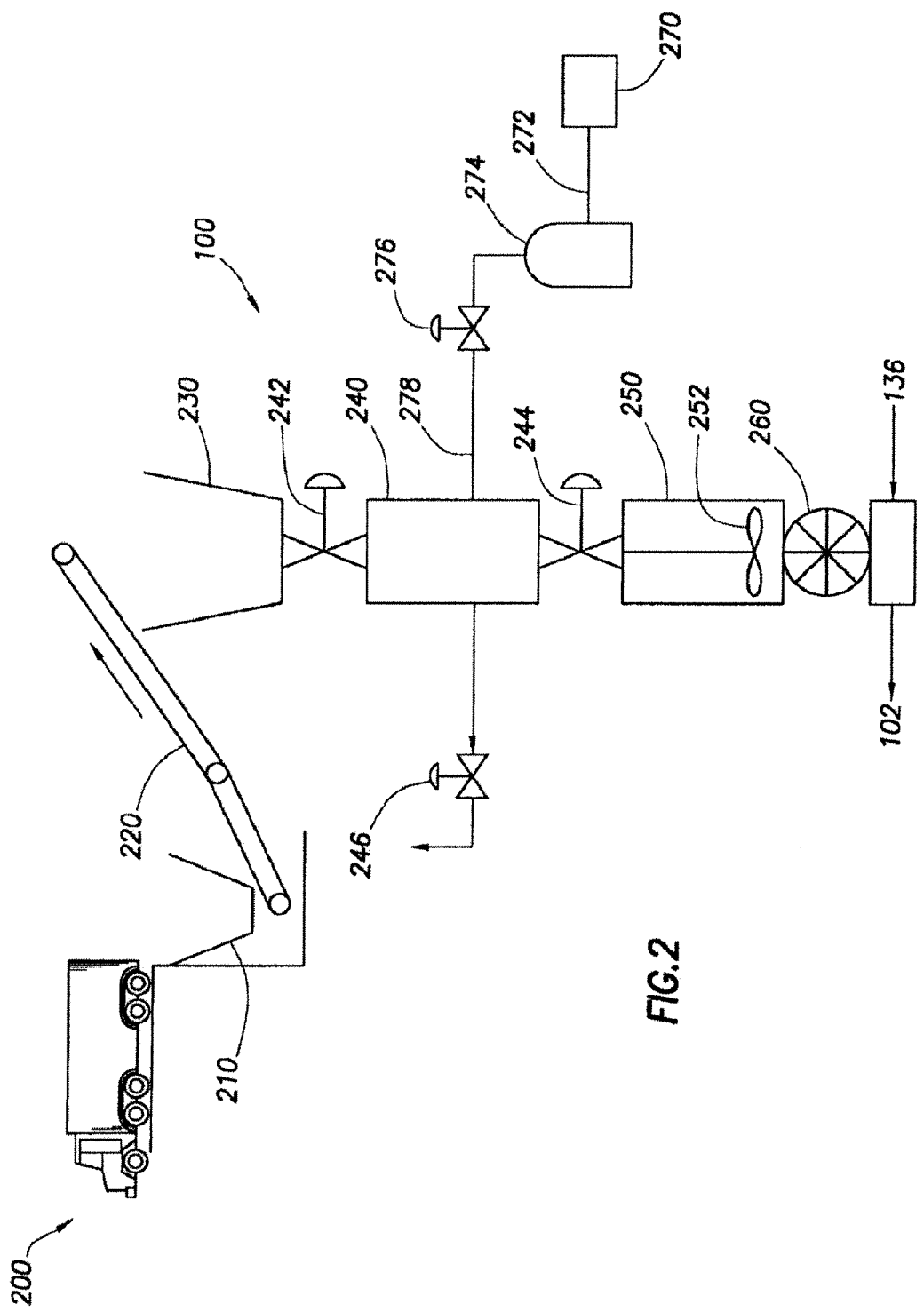
FIG. 2 is a schematic illustration of an example fuel input system and pressurized feed system in accordance with one embodiment of the present invention.
Figure 3:
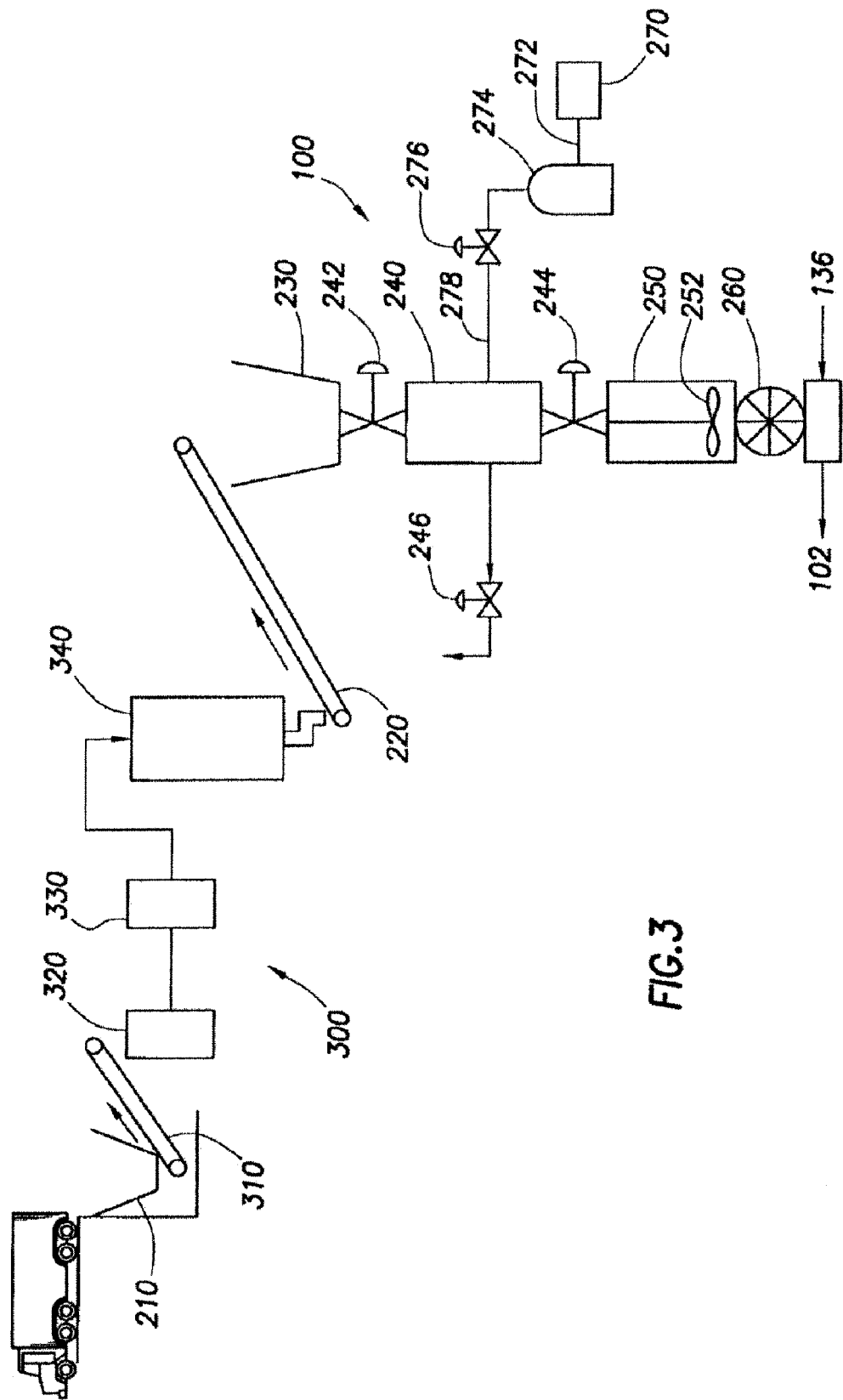
FIG. 3 is a schematic illustration of an example fuel input system and pressurized feed system in accordance with another embodiment of the present invention.

Referring now to FIG. 2, an example pressurized feed system 100 and an example fuel input system 200 are schematically illustrated. Fuel input system 200 supplies sized and dried biomass particles to pressurized feed system 100. Fuel input system 200 generally comprises input hopper 210 that can receive biomass particles from one or more sources (e.g., trucks, railcars, conveyor systems, storage bins, silos, etc.). Biomass conveyor 220 moves biomass particles from input hopper 210 to input chamber 230 at substantially atmospheric pressure. Biomass conveyor 220 may be any suitable device for moving the biomass particles to input chamber 230, for example, biomass conveyor 220 may be a screw conveyor.

Alternative methods may be used to supply sized and dried fuel to pressurized feed system 100. For example, FIG. 3 schematically depicts an alternate fuel input system 300. Alternative fuel input system 300 is similar to fuel input system 200 depicted in FIG. 2 except that alternate fuel system further comprises transfer conveyor 310, sizing equipment 320, drying equipment 330, and biomass storage silo 340. Raw biomass is supplied to alternative fuel input system 300 wherein the raw biomass is sized and dried to produce biomass particles suitable for combustion in combustion chamber 110.

As depicted in FIG. 3, one or more sources may supply raw biomass to input hopper 210. Transfer conveyor 310 then moves the raw biomass from input hopper 210 to sizing equipment 320. As an alternative to a conveyor system, a front-end loader or other suitable equipment may be used to move the raw biomass to sizing equipment 320. Sizing equipment 320 may include any equipment suitable for reducing the size of the raw biomass to a suitable size for cyclonic combustion, for example, having a major dimension of less than about 3 mm. For example, sizing equipment 320 may include hogging equipment, grinders, and/or pulverizers. The biomass particles produced by sizing equipment 320 are then transferred to drying equipment 330. Drying equipment 330 may include any suitable equipment for reducing the moisture content of the biomass particles to a level suitable for cyclonic combustion, for example, a moisture content of less than about 30%. An example of suitable drying equipment 330 may include a rotary-drum type dryer with electric drives. As discussed above, heat recovered from exhaust stream 137 may be used directly or indirectly to provide at least a portion of the heat needed for drying equipment 330. While not depicted on FIG. 3, separation equipment may be used to remove non-fuel materials (e.g., tramp metals) from the raw biomass prior to feed into sizing equipment 320 and drying equipment 330. Once biomass particles are dried in drying equipment 330, the sized and dried biomass particles are moved to biomass storage silo 340. The biomass particles may be moved to biomass storage silo 340 using any suitable methodology, for example, they may be pneumatically conveyed. Biomass storage silo 340 may be a closed silo with a capacity sufficient for a particular application. For example, biomass storage silo 340 may have a capacity sufficient to store up to 24-hours of the direct-fired biomass-fueled pressurized gas turbine system's feed requirements so that operation of the system is not interrupted due to temporary unavailability of the raw biomass. Biomass conveyor 220 moves biomass particles from biomass storage silo 340 to input chamber 230 at substantially atmospheric pressure.

While not depicted on FIG. 3, in certain embodiments, for example, where the raw biomass comprises tree limbs (e.g., up to about 12 inches in diameter), sizing equipment 320 may include a hogging operation to reduce the raw biomass to a size suitable for use in drying equipment 330. In these embodiments, subsequent to the drying equipment 330, additional sizing equipment (not depicted) (e.g., a grinder, a pulverizer, etc.) may be used to further reduce the size of the raw biomass to a size suitable for cyclonic combustion in combustion chamber 110.

Pressurized feed system 100 is schematically illustrated by FIGS. 2 and 3. In general, pressurized feed system 100 receive s biomass particles at substantially atmospheric pressure and supplies the biomass particles to combustion chamber 110 under pressure. Pressurized feed system generally comprises input chamber 230, transfer chamber 240, feed chamber 250, and rotary valve 260. Valves 242, 244 and air compressor 270 allow the transfer of the biomass particles from input chamber 230 at atmospheric pressure to feed chamber 250 at a pressure greater than the operating pressure of combustion chamber 110.

First valve 242 is positioned at the inlet of transfer chamber 240 and second valve 244 is positioned at the discharge of transfer chamber 240. While not depicted in FIGS. 2 and 3, each of valves 242, 244 may be electrically controlled by a solenoid valve. When open, first valve 242 allows biomass particles in input chamber 230 to move to transfer chamber 240. When open, second valve 244 allows biomass particles in transfer chamber 240 to move to feed chamber 250. To maintain pressure in feed chamber 250, first valve 242 should be closed when second valve 244 is open. Movement of the biomass particles from input chamber 230 to transfer chamber 240 and then to feed chamber 250 generally utilizes gravitational forces. Valves 242, 244 may be any suitable valve capable of maintaining the pressure differential between transfer chamber 240 and feed chamber 250 while cycling once per minute or even more frequently. For example, valves 242, 244 may be slide gate valves.

Air valve 276 enables pressurization of transfer chamber 240 to a pressure greater than the operating pressure of combustion chamber 110 by introducing compressed air from air reservoir 274 through air line 278. Air reservoir 274 is supplied compressed air from air compressor 270 via conduit 272. Valve 246 enables depressurization of transfer chamber 240, for example, to atmospheric pressure.

Feed chamber 250 includes mixer 252 (e.g., a paddle mixer, a ribbon mixer, or other suitable mixing equipment) to prevent (or reduce) the agglomeration of the biomass particles and to facilitate movement of the biomass particles to rotary valve 260.

Rotary valve 260 supplies the biomass particles under pressure from feed chamber 250 to pressurized fuel feed line 102. Rotary valve 260 should be constructed and arranged to feed variable amounts of biomass particles based on the operational requirements of combustion chamber 110 by means of a variable speed drive motor (not depicted). Rotary valve 260 is further constructed and arranged to minimize combustion pulsations in combustion chamber 110 by discharging the smallest amount of biomass particles possible within the constraints imposed by the gravimetric flow characteristics of the biomass particles. The gravimetric flow characteristics of the biomass particles are optimized by the agitation action of the mixer 252 prior to the inlet of the rotary valve 260. The rotary valve 260 then accepts the biomass particles in especially engineered pockets staggered across the width of the rotary valve. The rotational speed of the valve pockets controls the amount of biomass particles delivered into the pressurized fuel feed line 102. The minimal amount of particles in each valve pocket facilitates the smoothest possible delivery of biomass particles to the combustion chamber 110 with minimal pulsations. While not depicted in FIGS. 2 and 3, rotary valve 260 may be mounted inside a pressure vessel so that it can operate under pressure, for example, at a pressure greater than the operating pressure of combustion chamber 110. In one embodiment, rotary valve 260 operates at about 150 prig.

Pressurized feed system 100 may be used to provide a continuous supply of biomass particles to combustion chamber 110. In operation, biomass conveyor 220 supplies biomass particles to input chamber 230. The flow of biomass particles to transfer chamber 240 is controlled by first valve 242. First valve 242 may be opened to transfer biomass particles from input chamber 230 to transfer chamber 240. To maintain pressure in feed chamber 250, second valve 244 should be closed when biomass particles are being transferred into transfer chamber 240. Once the biomass particles have been transferred to transfer chamber 240, first valve 242 closes and transfer chamber 240 is pressurized. To pressurize transfer chamber 240, air valve 276 is opened and the compressed air from air reservoir 274 is introduced to transfer chamber 240. Transfer chamber 240 should be pressurized to a pressure greater than the operating pressure of combustion chamber 110. Second valve 244 may then open to move the biomass particles under pressure from transfer chamber 240 to feed chamber 250. Feed chamber 250 is generally maintained under pressure to facilitate the transfer of the biomass particles to combustion chamber 110. For example, feed chamber 250 may be maintained at a pressure greater than the operating pressure of combustion chamber 110. To maintain pressure in feed chamber 250, first valve 242 should remain closed during transfer of the biomass particles to feed chamber 250. After transfer of the biomass particles to feed chamber 250, second valve 244 may be closed, and transfer chamber 240 may be depressurized to atmospheric pressure by opening valve 246. The pressure cycle in transfer chamber 240 from atmospheric pressure to greater than the operating pressure of combustion chamber 110 may be repeated every minute or even more frequently. However, this pressure cycle may also occur less frequently than once per minute. The transfer of biomass particles to transfer chamber 240 may then be repeated. This cycle time may vary based on a number of factors, including the volume of the biomass particles, the capacity of transfer chamber 230 and feed chamber 240, and the desired flow rate of biomass particles to combustion chamber 110.

Rotary valve 260 should continuously supply the biomass particles under pressure from feed chamber 250 to pressurized fuel feed line 102. Second portion 136 of the compressed air stream 135 from compressor section 110 may convey the biomass particles from pressurized feed system 100 to combustion chamber 110 in pressurized fuel feed line 102. The biomass particles should be supplied to combustion chamber 110 at a rate sufficient to meet the operational requirements of combustion chamber 110 so that the desired power output from gas turbine 130 may be achieved. While not depicted in FIGS. 2 and 3, an air compressor (such as air compressor 270 or a second air compressor) may be used to convey the biomass particles from pressurized feed system 100 to combustion chamber 110 in pressurized fuel feed line 102. This air compressor may be used in place of, or in combination with, the pressurized gas from compressor section 110.

Those of ordinary skill in the art, with the benefit of this disclosure, will understand that alternate pressurized feed systems may be used to supply biomass particles to combustion chamber 110 under pressure, provided that sufficient biomass particles may be supplied to meet the operation requirements of combustion chamber 110.

Figure 4:
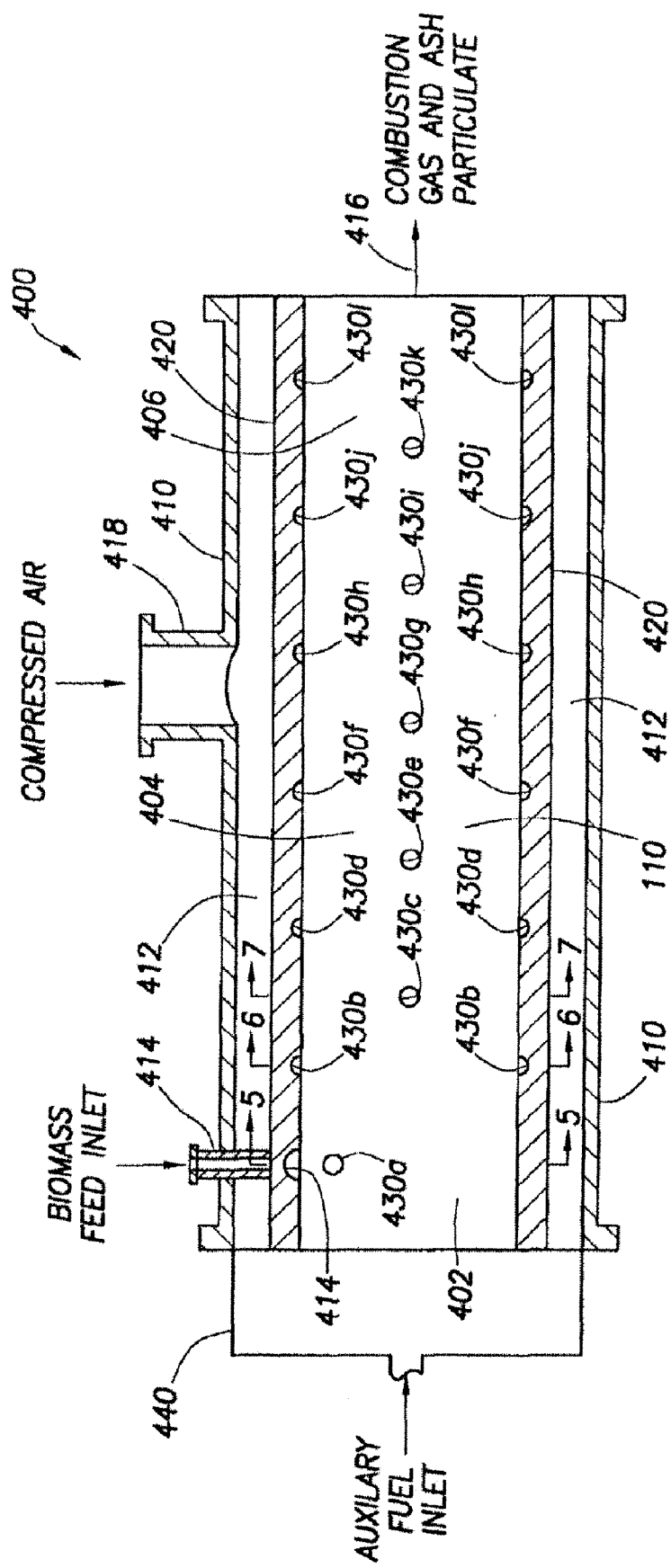
FIG. 4 is a schematic illustration of an example combustor in accordance with one embodiment of the present invention.

FIG. 4 schematically illustrates an example cyclonic combustor 400 for the pressurized combustion of biomass particles in combustion chamber 110. As depicted in FIG. 4, cyclonic combustor 400 generally comprises a metal outer casing 410, a combustion liner 420 forming a substantially cylindrically shaped combustion chamber 110. Cyclonic combustor 400 further comprises a biomass feed inlet 414 formed through combustion liner 420 for receiving biomass particles from pressurized feed system 100 through pressurized fuel feed line 102. For exit of the combustion gas and the ash particulate produced within combustion chamber 110 from combustion of the biomass particles, cyclonic combustor further comprises combustion chamber outlet 416. Further, a plurality of air tuyeres 430a, 430b, 430c, etc. are arranged to introduce compressed air into combustion chamber 110.

Outer casing 410 may have a generally cylindrical shape. Metal outer casing surrounds combustion liner 420 so as to define air feed plenum 412 between outer casing 410 and combustion liner 420. Combustion liner 420 may have a generally cylindrical shape and defines combustion chamber 110. Combustion liner 420 should comprise a material that is suitable for the operating conditions of combustion chamber 110. In some embodiments, the materials may be suitable for temperatures up to about 3,000° F. Examples of suitable materials include refractory materials and metals.

Figure 5:
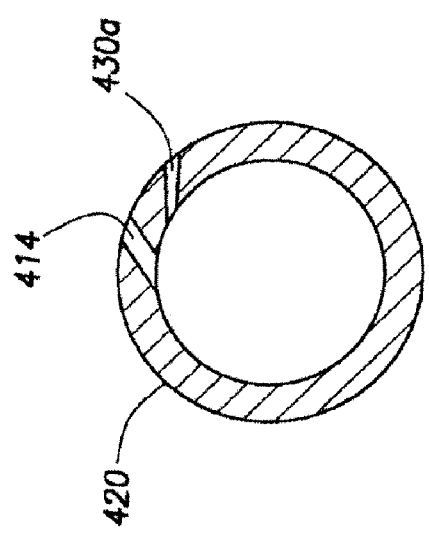
FIG. 5 is a cross-sectional view of the feed inlet taken along lines 5-5 of FIG. 4.

Combustion chamber 110 receives biomass particles for combustion through biomass feed inlet 414 at one end of combustion chamber 110. Biomass feed inlet 414 is formed through outer casing 410 and combustion liner 420. As illustrated by FIG. 5, biomass feed inlet 414 should be formed with a tangential component with respect to the longitudinal axis of combustion liner 420. This arrangement promotes the cyclonic motion of the biomass particles in combustion chamber 110. Air tuyere 430a provides compressed air that disperses the biomass particles supplied to combustion chamber 110. In combustion chamber 110, the biomass particles are entrained at a tangential velocity greater than about 80 feet per second ("ft/sec") and, in some examples, in the range of from about 100 ft/sec to about 200 ft/sec.

Combustion chamber 110 generally comprises three different zones, namely, ignition zone 402, combustion zone 404, and dilution zone 406. These three zones are arranged longitudinally along the axis of combustion chamber 110 with ignition zone 402 at one end of combustion chamber 110 and the dilution zone 406 at the other end of combustion chamber 110. Combustion zone 404 is located between ignition zone 402 and dilution zone 406.

In combustion chamber 110, the biomass particles are burned to produce particulate ash and a hot, pressurized combustion gas. The biomass particles enter combustion chamber 110 in ignition zone 402. In ignition zone 402, the biomass particles should be ignited. A sufficient amount of compressed air should be supplied to ignition zone 402 through air tuyeres 430a, 430b, 430c to ignite the biomass particles and facilitate at least partial combustion of the biomass particles. A substoichiometric amount of compressed air may be supplied to ignition zone 402 through air tuyeres 430a, 430b, 430c so that the biomass particles and oxygen in the compressed air react in a substoichiometric combustion. Substoichiometric combustion may be desired, in some examples, to control the flame temperature of the biomass particles so as to reduce the formation of nitrous oxides from the combustion of the biomass particles.

Biomass particles and combustion products pass from ignition zone 402 to combustion zone 404 wherein the combustion of the biomass particles is completed. In addition to a sufficient supply of compressed air for combustion, the compressed air supplied to combustion zone 404 by air tuyeres 430d, 430e, 430f, 430g, 430h also dilutes the combustion products.

Figure 10:
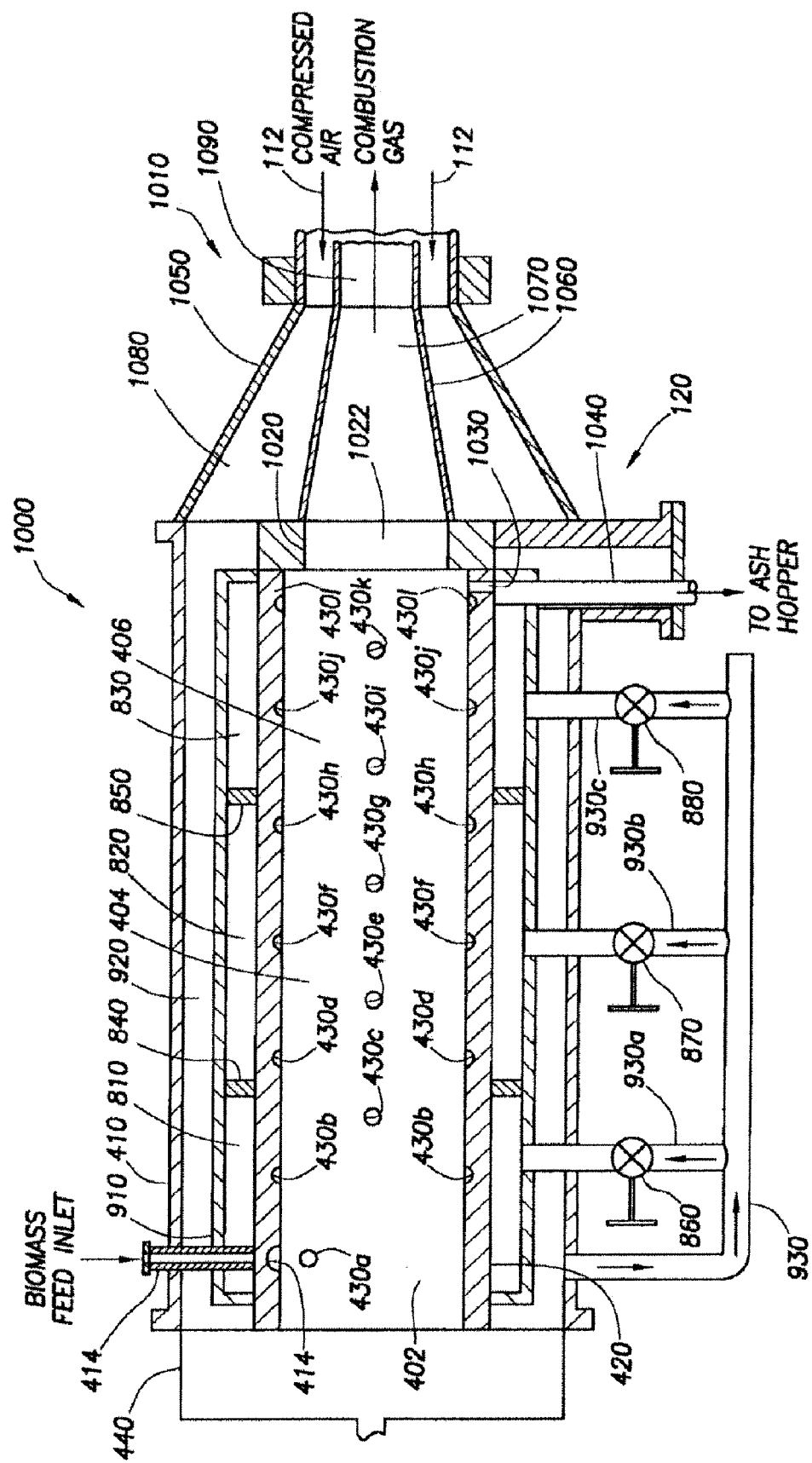
FIG. 10 is a schematic illustration of an example combustor containing a cyclonic ash separator in accordance with one embodiment of the present invention.

After passing through combustion zone 404, the combustion products enter dilution zone 406. A sufficient amount of compressed air should be supplied to dilution zone 404 by air tuyeres 430i, 430j, 430k, 430l to complete dilution of the combustion products. Complete dilution of the combustion gas should facilitate cooling of the combustion gas to a temperature suitable for use in gas turbine 130, for example, less than about 2,200° F. and, in some examples, in the range of from about 1,500° F. to about 2,200° F. Completing dilution in combustion chamber 110 may be desired, for example, where combustor 400 further comprises cyclonic ash separator 120, as illustrated in FIG. 10. The combustion gas and particulate ash produced from combustion of the biomass particulates exit dilution zone 404 via combustion chamber outlet 416. Combustion chamber outlet 416 may be at the opposed end of combustion chamber 110 from biomass feed inlet 414.

As discussed above, the compressed air needed for combustion of the biomass particles and dilution of the combustion products is supplied to combustion chamber 110 through a plurality of air tuyeres 430a, 430b, 430c, etc. formed through combustion liner 420. The tuyere openings generally may have a conical shape (narrowing towards the combustion chamber), and a length/width aspect ratio exceeding about 2:1 and, in some examples, in a range of 3:1 to 5:1. As illustrated by FIGS. 6 and 7, air tuyeres 430a, 430b, 430c, etc. should be formed with a tangential component with respect to the longitudinal axis of combustion liner 420. This arrangement promotes cyclonic motion within combustion chamber 110. The compressed air is generally supplied through the plurality of air tuyeres 430a, 430b, 430c, etc. at a tangential velocity greater than about 100 ft/sec and, in some examples, in the range of from about 110 ft/sec to about 150 ft/sec. The air tuyeres 430a, 430b, 430c, etc. are in communication with air feed plenum 412, which is supplied compressed air via compressed air feed line 112 from compressor section 132. Compressed air feed line 112 supplies the compressed air to air feed plenum 412 through air inlet 418 formed through outer casing 410.

The tuyeres 430a, 430b, 430c, etc. should be constructed and arranged to supply the air needed in each zone of combustion chamber 110. Rows containing at least one of the plurality of air tuyeres 430a, 430b, 430c, etc. are generally spaced apart along the length of combustion liner 420 with in the range of from about 2 rows to about 20 or more rows. In one example, there are 12 rows spaced along the length of combustion liner 420. In one example, 4 rows in ignition zone 402, 5 rows in combustion zone 404, and 3 rows in dilution zone 406. Each row may contain from 1 to about 20 or more tuyeres distributed in the same plane. As indicated in FIGS. 4-10, air tuyeres 430a, 430b, 430c, etc. may be arranged in a staggered pattern, wherein the at least one tuyere in each row is displaced 90° along the circumference of combustion liner 420 with respect to the preceding row. For example, air tuyeres 430b may be displaced 90° along the longitudinal axis of combustion liner 420 with respect to air tuyeres 430c.

Also, each of the plurality of tuyeres 430a, 430b, 430c, etc. may have the same size or different sizes as desired for a particular application. For example, the tuyeres 430a, 430b, 430c, etc. in the same row and/or zone may be the same or different sizes as desired for a particular application. Tuyere size may be adjusted to control the air flow into the zones of combustion chamber 110 and thus control the flame temperature of the biomass particles. As desired, the flame temperature may be adjusted to reduce the formation of nitrogen oxides from the combustion. In some embodiments, at least one tuyere in each row may increase in size along the length of combustion liner 420 from biomass feed inlet 414. In one example, the tuyeres 430a, 430b, 430c, etc. may linearly increase in size. While not illustrated in FIG. 4, tuyeres 430b would be larger than tuyere 430a, tuyeres 430c would be larger than tuyeres 430b with tuyeres 430i, 430j, 430k, 430l being the largest tuyeres in combustion liner 420. In some embodiments, the tuyeres 430a, 430b, 430c of the ignition zone 402 and the tuyeres 430d, 430e, 430f, 430g, 430h of combustion zone 404 may increase in size along the longitudinal axis of combustion chamber 110 from biomass feed line 414. For example, in one example, the tuyeres 430d, 430e, 430f, 430g, 430h of combustion zone 404 may be larger than the largest tuyere in ignition zone 402. The holes in dilution zone 406 may be the same or larger than the largest tuyeres in ignition zone 402 and combustion zone 404.

Those of ordinary skill in the art will recognize that computational fluid modeling may be used to determine the optimal tuyere size, tangential velocity of the compressed air, the number of tuyeres in each zone of combustion chamber 110, and the quantity of compressed air supplied to each zone.

Combustor 400 further may comprise burner 440. Burner 440 may operate on an auxiliary fuel, such as natural gas, propane, or a liquid fuel. Burner 440 may be used during start-up of combustor 400 to heat combustion liner 410 to a temperature sufficient to ignite the biomass particulates and/or ignite the biomass particulates for a desired period of time during start up. Burner 440 may be sized for start-up only, or, alternatively, burner 440 may be sized to allow full throughput through the system so that electrical output from generator 140 may remain constant, for example, where the supply of biomass particles may be restricted. In one example, burner 440 is capable of direct firing a gas turbine, such as gas turbine 130.

FIG. 8 schematically illustrates an alternate cyclonic combustor 800. Cyclonic combustor 800 is similar to cyclonic combustor 400 depicted on FIG. 4, except that cyclonic combustor 800 comprises a plurality of air feed plenums 810, 820, 830 defined between outer casing 410 and combustion liner 420. The plurality of air feed plenums 810, 820, 830 are separated by a plurality of baffles 840, 850. Each of the plurality of air feed plenums 810, 820, 830 is in communication with at least one of the plurality of air tuyeres 430. For example, first chamber 810 is in communication with air tuyeres 430a, 430b, 430c. Air tuyeres 430a, 430b, 430c, etc. are supplied air from compressed air feed line 112 via air feed plenums 810, 820, 830. Each of the plurality of air feed plenums 810, 820, 830 communicate with a respective portion 112a, 112b, 112c of compressed air feed line 112 from compressor section 132. According to the operational requirements of each zone of combustion chamber 110, compressed air supply into each of the plurality of air feed plenums 810, 820, 830 is controlled by a plurality of valves 860, 870, 880, respectively. For example, valve 860 should control the supply of compressed air into ignition zone 402 of combustion chamber 110 to ensure a sufficient supply of compressed air to ignite the biomass particles. Valve 870 should control the supply of compressed air into combustion zone 404 of combustion chamber 110 to ensure a sufficient supply of compressed air to completely combust the biomass particles and begin dilution of the combustion products. Valve 880 should control the supply of compressed air into dilution zone 406 of combustion chamber 110 to ensure a sufficient supply of compressed air to completely dilute the combustion products.

Figure 9:
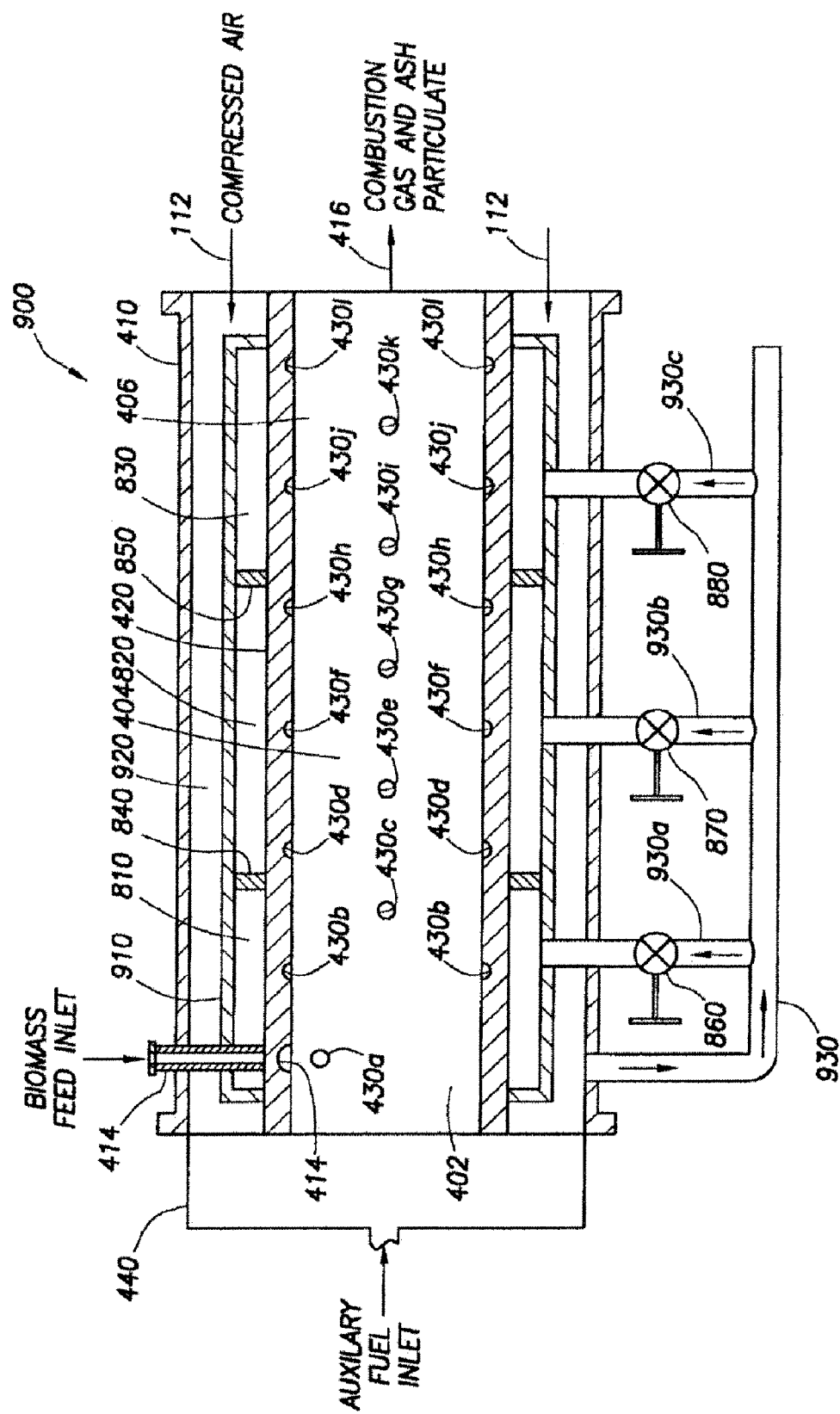
FIG. 9 is a schematic illustration of an example combustor in accordance with another embodiment of the present invention.

FIG. 9 schematically illustrates an alternate cyclonic combustor 900. Cyclonic combustor 900 is similar to cyclonic combustor 800 depicted on FIG. 8, except that cyclonic combustor 900 further comprises an intermediate lining 910 having a generally cylindrical shape between outer casing 410 and combustion liner 420. Cooling plenum 920 is defined between outer casing 410 and combustion liner 420. Compressed air from compressor section enters cooling plenum 920 through compressed air feed 112 and is pre-heated by radiant heat from combustion chamber 110 thereby cooling combustion chamber 110. After being pre-heated, this compressed air enters tube 930 which separates into three portions 930a, 930b, 930c. Each of the plurality of air feed plenums 810, 820, 830 communicate with a respective portion 860, 870, 880 so that air is supplied to a respective zone of combustion zone 110 through air tuyeres 430. According to the operational requirements of each zone of combustion chamber 110, compressed air supply into each of the plurality of air feed plenums 810, 820, 830 is controlled by a plurality of valves 860, 870, 880, respectively.

FIG. 10 schematically illustrates an alternate cyclonic combustor 1000. Cyclonic combustor 1000 is similar to cyclonic combustor 900 depicted on FIG. 9, except that cyclonic combustor 1000 further comprises cyclonic ash separator 120 and transition assembly 1010. In general, cyclonic ash separator 120 comprises choke element 1020, particulate ash opening 1030 formed between choke element 1020 and combustion liner 420, and ash collection passageway 1040 in communication with combustion chamber 110 via particulate ash opening 1030.

At the exit of dilution zone 406 of combustion chamber 110, a centrally located choke element 1020 is provided with opening 1022 therein. Opening 1022 in choke element 1020 may be generally cylindrical in shape or have any other suitable shape. For example, opening 1022 may be made with a generally non-circular shape. Opening 1022 should have a cross-sectional area smaller than that of combustion chamber 110. For example, opening 1022 may have a cross-sectional area in the range of from about 80% to about 90% of the cross-sectional area of combustion chamber 110. If desired choke element 1020 may be lined with a material (e.g., a refractory material or a metal) that is suitable for the operating conditions of combustion chamber 110.

Particulate ash opening 1030 is located between choke element 1020 and combustion liner 420. Particulate ash opening 1030 may extend from 90° to about 180° along the circumference of the lower half of combustion liner 420. Ash collection passageway 1040 is in communication with combustion chamber 110 via particulate ash opening 1030.

Transition assembly 1010 generally should be constructed and arranged to minimize the transfer of forces from cyclonic combustor 1000 to gas turbine 130. In general, transition assembly 1010 comprises outer casing 1050 and inner shell 1060 forming a substantially cylindrically shaped combustion gas passageway 1070.

Outer casing 1050 may have a generally conical shape with the wider end adjacent to cooling chamber 110. Alternatively, outer casing 1050 may have a cylindrical shape or may even be non-circular shaped. Outer casing 1050 surrounds inner shell 1060 so as to define cooling plenum 1080 between outer casing 1050 and inner shell. Transition assembly 1010 should be constructed and arranged so that cooling plenum 1080 of transition assembly 1010 is in communication with cooling plenum 920 of cyclonic combustor 1000. While not depicted in FIG. 10, outer casing 1050 of transition assembly 1010 may be coupled to outer casing 410 of cyclonic combustor 1000 using any suitable methodology, for example, a bolted flange may be used to couple outer casing 1050 to outer casing 410.

A substantially cylindrically shaped combustion gas passageway 1070 comprising an inlet and an outlet is defined by inner shell 1060. Alternatively, combustion gas passageway 1070 may be any other suitable shape, for example, non-circular. Combustion gas passageway 1070 may be tapered from cyclonic ash separator 120 to transition assembly outlet 1090 so that the outlet of the combustion gas passageway 1070 has a smaller cross-sectional area than the inlet. Transition assembly 1010 should be constructed and arranged so that combustion gas passageway 1070 is in communication with combustion chamber 110 via opening 1022 in choke element 1020 of cyclonic ash separator 120.

In operation, due to the cyclonic motion and high tangential velocity of the combustion gas and particulate ash in combustion chamber 110, high centrifugal forces are generated thereon. As a result of the centrifugal forces, the particulate ash revolves in combustion chamber 110 adjacent to combustion liner 410 so that the particulate ash passes through particulate ash opening 1030 and passes through ash collection passageway 1040 to ash hopper (not depicted) where it is collected. The combustion gas generally moves from combustion chamber 110 to opening 1022 in choke element 1020 to combustion gas passageway 1070. While passing through combustion gas passageway 1070, the combustion gas is cooled by heat exchange with the compressed air in cooling plenum 1080 from compressed air feed 112. The compressed air passes through cooling plenum 1080 to cooling plenum 920 of combustor 1000. The combustion gas generally exits transition assembly 1010 via transition assembly outlet 1090 after passing through combustion gas passageway 1070. This combustion gas is then supplied to gas turbine 130 as depicted in FIG. 1.

The term "couple" or "couples" used herein is intended to mean either an indirect or direct connection. Thus, if a first device couples to a second device, that connection may be through a direct connection, or through an indirect electrical connection via other devices and connections.

The present invention is therefore well-adapted to carry out the objects and attain the ends mentioned, as well as those that are inherent therein. While the invention has been depicted, described and is defined by references to examples of the invention, such a reference does not imply a limitation on the invention, and no such limitation is to be inferred. The invention is capable of considerable modification, alteration and equivalents in form and function, as will occur to those ordinarily skilled in the art having the benefit of this disclosure. The depicted and described examples are not exhaustive of the invention. Consequently, the invention is intended to be limited only by the scope of the appended claims, giving full cognizance to equivalents in all respects.

What is claimed:
1. A cyclonic combustor comprising:
   a combustion liner forming a combustion chamber having a generally cylindrical shape and operable to have an ignition zone, a combustion zone, and a dilution zone arranged longitudinally along the axis of the combustion chamber;
   a biomass feed inlet at one end of the combustion chamber formed through the combustion liner for receiving biomass particles under pressure, wherein the biomass feed inlet is formed so that the biomass particles are intro- duced into the ignition zone of the combustion chamber with a tangential component relative to the longitudinal axis of the combustion liner;

a plurality of air tuyeres formed through the combustion liner for receiving compressed air,
wherein the plurality of air tuyeres are arranged to introduce the compressed air into the combustion chamber with a tangential component relative to the longitudinal axis of the combustion liner, wherein the plurality of air tuyeres are spaced along the length of the combustion liner from about the biomass feed inlet,
wherein at least one of the plurality of air tuyeres is operable to supply a sufficient amount of compressed air to the ignition zone for ignition of the biomass particles to begin the combustion, wherein at least one of the plurality of air tuyeres is operable to supply a sufficient amount of compressed air to the combustion zone to complete the combustion of the biomass particles from the ignition zone, and
wherein at least one other of the plurality of air tuyeres is operable to supply a sufficient amount of compressed air to the dilution zone to dilute the combustion gas to a temperature suitable for use in a gas turbine;

an outer casing having a generally cylindrical shape and surrounding the combustion liner;

an inner lining having a generally cylindrical shape and surrounding the combustion liner so as to define at least two air plenums between the outer casing and the combustion liner wherein the at least two air plenums are in communication with the combustion chamber via the plurality of air tuyeres so that the compressed air is supplied to the combustion chamber through the at least two air plenums; and
wherein the outer casing surrounds the intermediate liner so as to define a cooling plenum between the outer casing and the intermediate liner, wherein the cooling plenum is in communication with the at least two air plenums so that the compressed air is supplied to the air plenums via the cooling plenum.

2. The cyclonic combustor of claim 1 further comprising a cyclonic ash separator comprising:
a choke element comprising an opening of reduced cross-section area as compared to the cross-sectional area of the combustion chamber, an input in communication with the combustion chamber outlet for receiving the combustion gas from the combustion and dilution zone chamber, and an output in communication with the turbine section of the gas turbine for supplying the gas turbine with the combustion gas; and
a particulate ash opening defined between the choke element and the combustion liner wherein at least a portion of the particulate ash exits the combustion chamber via the particulate ash opening.

3. The cyclonic combustor of claim 1 wherein the cyclonic ash separator comprises an input in communication with the combustion chamber outlet for receiving a mixture of the combustion gas and particulate ash, wherein the cyclonic ash separator at least partially separates the combustion gas from the particulate ash and further comprises an outlet in communication with the turbine section of the gas turbine for supplying the gas turbine with the combustion gas.

4. The cyclonic combustor of claim 1 wherein a sub-stoichiometric amount of compressed air is supplied to the ignition zone.

5. The cyclonic combustor of claim 1 wherein the plurality of tuyeres increase in size along the length of the longitudinal axis of the combustion liner.

6. The cyclonic combustor of claim 1 wherein the plurality of tuyeres are arranged in a plurality of rows spaced along the length of the longitudinal axis of the combustion liner, wherein each row contains at least one tuyere distributed along the same plane.

7. The cyclonic combustor of claim 6 wherein the at least one air tuyere in one or more of the plurality of rows is displaced about 90 degrees along the circumference of the combustion liner with respect to the preceding row.

8. The cyclonic combustor of claim 6 wherein the at least one air tuyere in one or more of the plurality of rows is larger than the at least one air tuyere in the combustion liner with respect to the preceding row.

9. The cyclonic combustor of claim 1 comprising a transition assembly comprising an inner lining that forms a combustion gas passageway, the combustion gas passageway comprising an inlet in communication with the output of the choke element for receiving the combustion gas, and an outlet in communication with the gas turbine for supplying the gas turbine with the combustion gas.

10. The cyclonic combustor of claim 9 wherein the combustion gas passageway has a smaller cross sectional area at the outlet than at the inlet.

11. The cyclonic combustor of claim 2 wherein a burner is connected to the cyclonic combustor.

12. A direct-fired biomass-fueled pressurized gas turbine system comprising:
a pressurized feed system;
a cyclonic combustor, comprising:
a combustion liner forming a combustion chamber having a generally cylindrical shape and operable to have an ignition zone, a combustion zone, and a dilution zone arranged longitudinally along the axis of the combustion chamber;
a biomass feed inlet at one end of the combustion chamber formed through the combustion liner for receiving biomass particles under pressure, wherein the biomass feed inlet is formed so that the biomass particles are introduced into the ignition zone of the combustion chamber with a tangential component relative to the longitudinal axis of the combustion liner;
a plurality of air tuyeres formed through the combustion liner for receiving compressed air,
wherein the plurality of air tuyeres are arranged to introduce the compressed air into the combustion chamber with a tangential component relative to the longitudinal axis of the combustion liner, wherein the plurality of air tuyeres are spaced along the length of the combustion liner from about the biomass feed inlet,
wherein at least one of the plurality of air tuyeres is operable to supply a sufficient amount of compressed air to the ignition zone for ignition of the biomass particles to begin the combustion,
wherein at least one of the plurality of air tuyeres is operable to supply a sufficient amount of compressed air to the combustion zone to complete the combustion of the biomass particles from the ignition zone, and
wherein at least one other of the plurality of air tuyeres is operable to supply a sufficient amount of compressed air to the dilution zone to dilute the combustion gas to a temperature suitable for use in a gas turbine;
an outer casing having a generally cylindrical shape and surrounding the combustion liner; and an inner lining having a generally cylindrical shape and surrounding the combustion liner so as to define at least two air plenums between the outer casing and the combustion liner wherein the at least two air plenums are in communication with the combustion chamber via the plurality of air tuyeres so that the compressed air is supplied to the combustion chamber through the at least two air plenums; and wherein the outer casing surrounds the intermediate liner so as to define a cooling plenum between the outer casing and the intermediate liner, wherein the cooling plenum is in communication with the at least two air plenums so that the compressed air is supplied to the air plenums via the cooling plenum;

a gas turbine comprising:
a turbine section comprising an inlet in communication with the combustor for receiving the combustion gas from the combustion chamber, wherein the turbine section is driven by the combustion gas.

13. The system of claim 12 wherein the pressurized feed system comprises:
a plurality of chambers; wherein a first chamber receives biomass particles at atmospheric pressure and supplies a second chamber with biomass particles under pressure;
a first valve positioned at an inlet of the first chamber;
a second valve positioned at an outlet of the first chamber communicating with the inlet to the second chamber; and
an air compressor arranged to pressurize the first chamber.

14. The system of claim 13 wherein the first valve and the second valve are slide gate valves.

15. The system of claim 12 wherein the pressurized feed system further comprises a rotary valve arranged to feed variable amounts of biomass particles to the combustion chamber.

16. The system of claim 12 wherein each of the at least two air plenums are in communication with a corresponding compressed air feed; wherein the corresponding compressed air feed comprises a valve for controlling the supply of the compressed air to the combustion chamber through the air plenum that is in communication with the valve.

17. The system of claim 12 wherein the gas turbine further comprises a compressor section driven by the turbine section of the gas turbine, wherein the compressor section is arranged to provide the compressed air to the combustion chamber.

18. The system of claim 17 wherein a first portion of the compressed air from the compressor section is supplied to the combustion chamber, and a second portion of the compressed air conveys the biomass particles from the pressurized feed system to the combustion chamber.

19. The system of claim 12 comprising a heat exchanger for cooling the second portion of the compressed air from the compressor section.

20. The system of claim 12 wherein the gas turbine has a pressure ratio in the range of from 8:1 to 20:1.

21. The system of claim 12 further comprising an electric generator coupled to the gas turbine for generating electric power, wherein the electric generator is driven by the turbine section of the gas turbine.

22. The system of claim 21 wherein the system is constructed and arranged to generate less than 10 megawatts of electricity.

23. The system of claim 21 wherein the gas turbine comprises a single shaft that drives the compressor section and the electric generator.

24. The system of claim 12 wherein the direct-fired biomass-fueled pressurized gas turbine system further comprises a heat recovery unit in communication with an exhaust stream from the turbine section of the gas turbine.

25. The system of claim 12 further comprising a fuel input system for providing sized and dried biomass particles to the pressurized feed system.

26. The system of claim 12 further comprising a second air compressor arranged to supply compressed air that conveys the biomass particles from the pressurized feed system to the combustion chamber.

* * * * *